July 22, 1969  M. LUTZ  3,456,913
MOLD FOR MAKING A CONTAINER HAVING AN INTEGRALLY
MOLDED TWO-PIECE HINGE
Filed Feb. 21, 1967  4 Sheets-Sheet 1
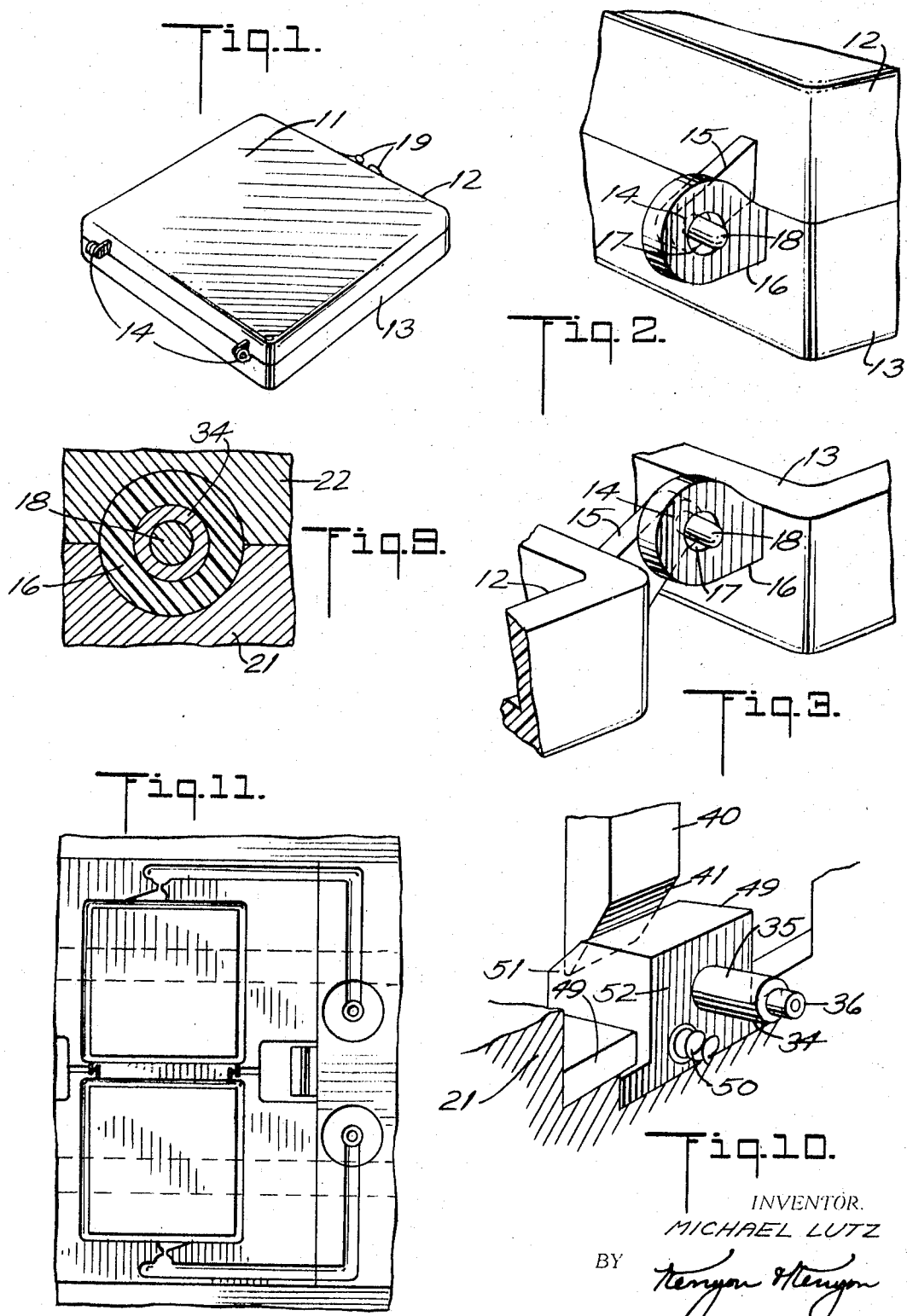
INVENTOR.
MICHAEL LUTZ
BY Kenyon & Kenyon
ATTORNEY

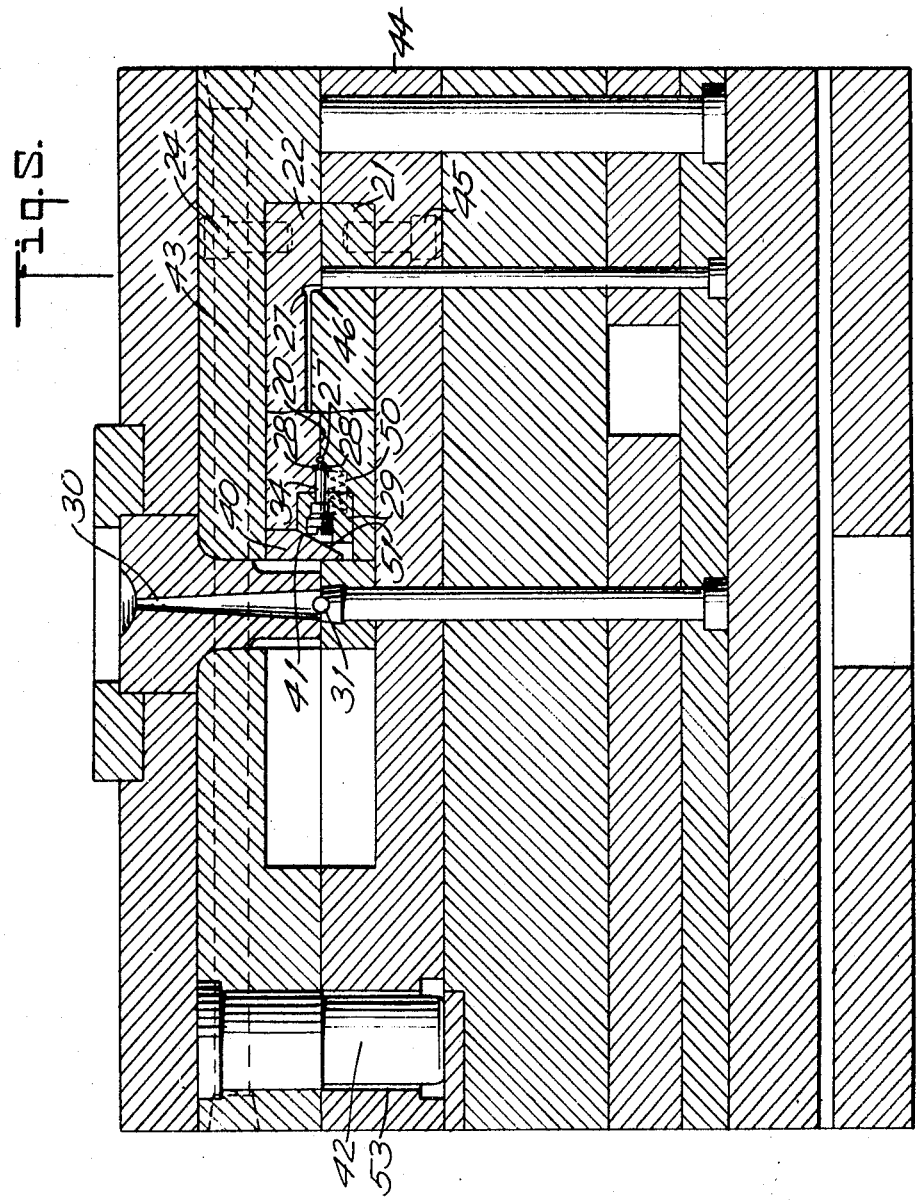

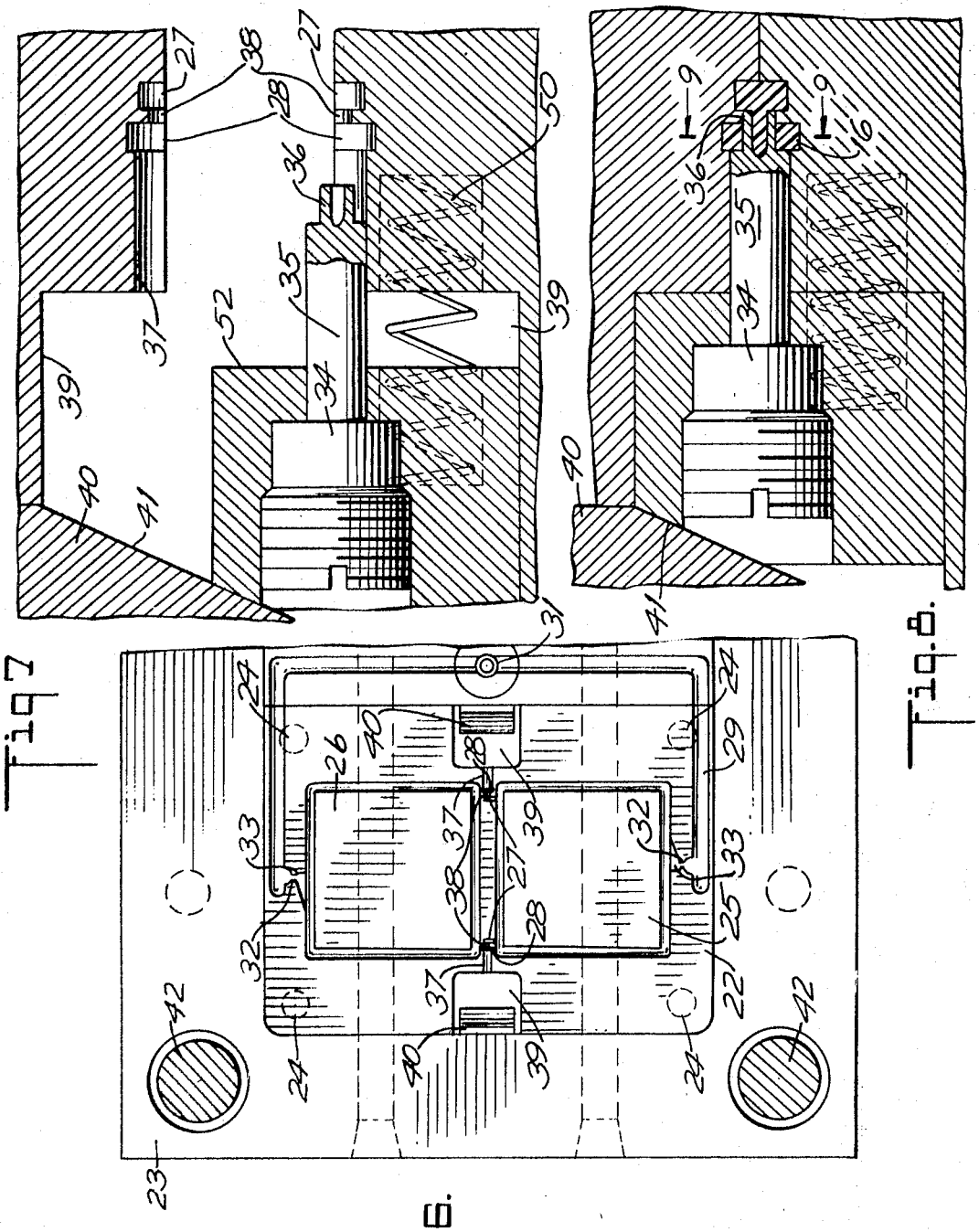

United States Patent Office 3,456,913
Patented July 22, 1969

3,456,913
MOLD FOR MAKING A CONTAINER HAVING AN INTEGRALLY MOLDED TWO-PIECE HINGE
Michael Lutz, 92 Edgewood Ave., Springfield, N.J. 07081
Filed Feb. 21, 1967, Ser. No. 617,675
Int. Cl. B29c 11/00; E05d
U.S. Cl. 249—63       1 Claim

ABSTRACT OF THE DISCLOSURE

The invention relates an apparatus for molding at least two articles with the articles connected by hinges which are integral with the articles. In accordance with the manner of using the apparatus of the invention, the articles and hinges are molded at the same time with both being molded in an integral and operative configuration. The mold has cavities for forming the articles and cavities connected therewith for forming the male and female hinge members which connect with the article forming cavities. Hollow core-pins when advanced through the female hinge member forming cavity transform the cavity into an annular cavity adapted to form the eye portion of the female hinge member. At the same time the hollow head of the core-pin opens into the male hinge member cavity and is so located that the material used for forming the articles flows into the hollow cavity and forms the pintle on the male hinge member in an engaged relationship with the eye portion of the female hinge member. As a result, upon withdrawing the core-pins, the two articles are removed from the mold with their connecting hinges engaged.

---

This invention relates to improvements in apparatus for molding plastic hinges and more particularly to a novel apparatus for integrally molding hinged plastic containers with the container hinges engaged in their operative position.

The prior art relating to hinged plastic containers has approached the general problem of manufacturing these devices by individually forming the two portions of the container separately and then connecting the two portions by means of separately manufactured hinge means which are attached to the container. This approach requires a number of molds, is time consuming, relatively expensive and inefficient.

In accordance with later improvements, the container portions each include one portion of a hinge and the respective portions are individually molded. The container portions are molded in such a way that the hinge forming part of each container portion can be mated with the other container portion having the remaining part of the hinge. Although this is an improvement, it still requires the step of forming the hinge portions and then the separate and independent step of mating the container portions. This latter approach can cause added expense and require additional time in assembling the container. Where containers of substantially rigid material or those having delicate hinge parts or hinges of very thin proportions are to be used, this later method is obviously unsuitable.

One of the objects of this invention is to provide an apparatus for integrally molding top and bottom portions of a container with the hinged portions thereof molded in an engaged and operative position, thus eliminating the step of assembling the hinges into engagement after molding.

Another object of the invention is to provide an apparatus for integrally molding the container portions and their hinges in such a way that the hinges are prevented from being separated subsequent to their manufacture.

Another object of the invention is to provide an apparatus for integrally molding hinged plastic containers with the hinges in the engaged and operative position and with container top and bottom portions of different colors and different materials using one mold only.

Another object of the invention is to provide an apparatus for integrally molding hinged plastic containers with the hinges in the engaged and operative position using one mold only and therefore making the method more economical.

Yet other features of the invention are to be found in the apparatus hereinafter described and particularly pointed out in the appended claim.

Accordingly an article having two parts connected to one another by a hinge can be formed engaged to one another by a single molding operation using the mold of the invention. The mold having cavities for forming each part of the article and having receses in communication with the cavities for forming the two members of the hinge is employed in accordance with the invention. The recesses for forming the two members of the hinge are positioned relative to one another in correspondence to the relative position of the members when engaged to form a hinge.

Initially a hollow core is advanced through one of the recesses and adjacent to the other of the recesses which form the two members of the hinge. The outer surface of the hollow core forms an annular region in one recess while the hollow portion of the core forms an elongated recess which extends from the other of the recesses. Molding material is injected into the cavities and recesses of the mold and with respect to the outer surface and the hollow portion of the core. The molding material is then permitted to set within the mold. Upon retracting the core from adjacent the other of the recesses and from extending through the one recess, the article can be withdrawn from the mold. The hollow portion of the core forms a hinge pin or pintle while the outer surface of the core forms an opening through which the hinge pin or pintle extends. As a result the two parts of the article are molded with the hinge connecting them being integrally attached to the two parts and at the same time engaged with one another.

In a variation of the method disclosed herein, it is possible, utilizing a mold having two sprues each connected to a separate runner and using different molding materials in each sprue, to mold a container as set forth herein, having a top portion and a bottom portion of differing materials and differing colors.

The method disclosed herein has solved the problems of extra independent operations, added expense and limitations on types of plastics and hinge constructions by providing a method which allows the container to be manufactured with the hinges integral to the two portions of the container and simultaneously being molded in the hinged position. The entire article is thus produced in one operation. The result produces the finished article ready for use without the added steps of either attaching the hinges to the container portions or taking the separate container portions with the hinged parts already attached and mating the two container portions.

In the accompanying drawings:

FIG. 1 is a perspective view of a container having integrally molded hinges made in accordance with the apparatus of the invention;

FIG. 2 is a fragmentary perspective view of a hinged container produced by the apparatus of the invention and showing the closed container;

FIG. 3 is a fragmentary respective view of the hinged container of the invention in an opened position;

FIG. 5 is a vertical section view taken along line 5—5 in FIG. 4 and showing the mold mounted in an injection molding machine;

FIG. 6 is a plan view of a cavity block which registers with the mold force in the apparatus of the invention;

FIG. 7 is an enlarged fragmentary view of a retractable core pin for molding the hinge of the invention, the core pin being shown in a partially retracted position;

FIG. 8 is a fragmentary enlarged view similar to FIG. 7 of a core pin mounted on a retractable spring-loaded slide in the inserted position;

FIG. 9 is an enlarged fragmentary vertical section view along the line 9—9 of FIG. 8 showing the retractable core pin of the invention disposed relative to the cavity block and the mold force;

FIG. 10 is a perspective view of a core pin mounted on a retractable actuating slide; and FIG. 11 is a plan view of a cavity block having two runners, each runner having a separate sprue connected to said runner.

Figure 4:
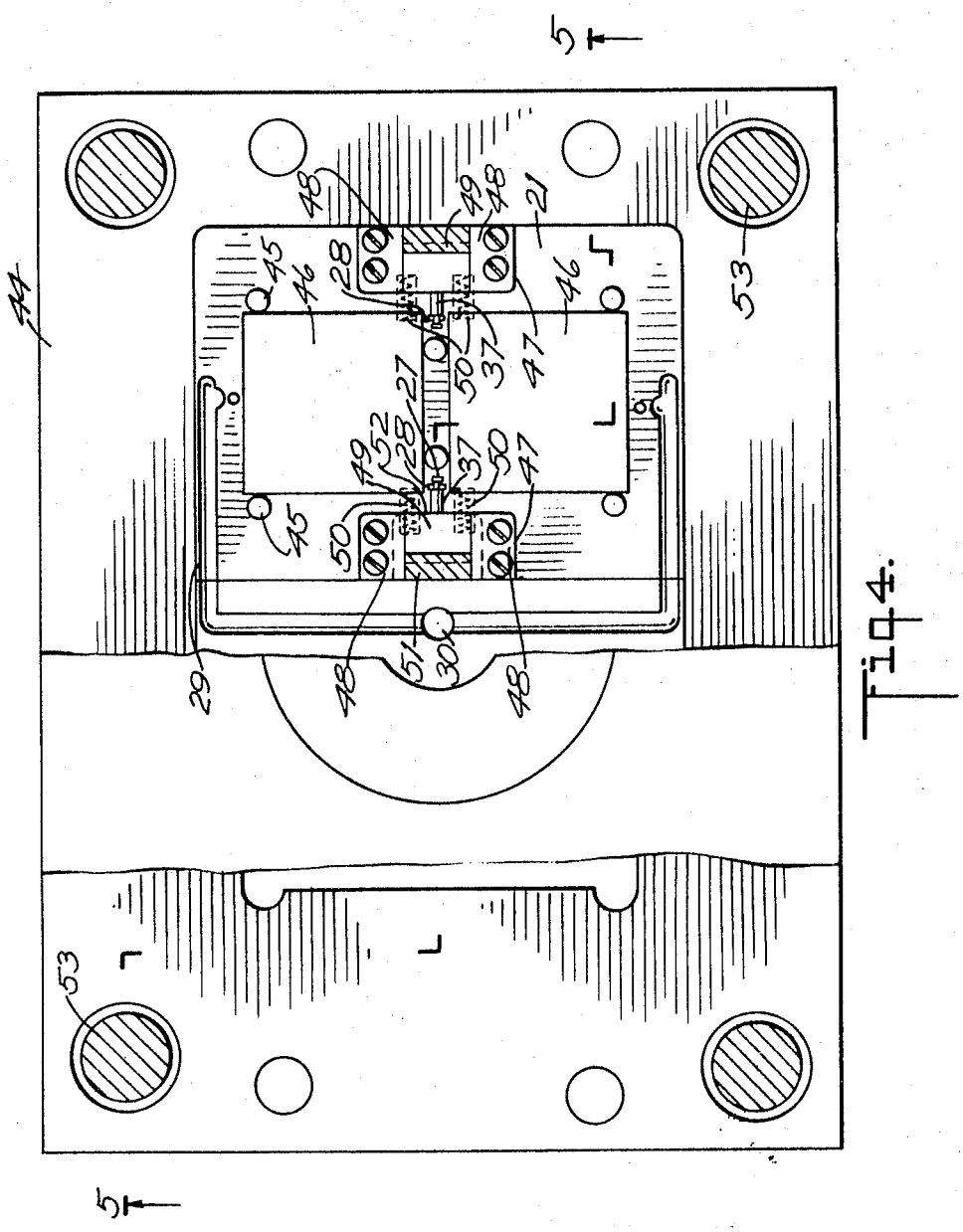
FIG. 4 is a plan view of a mold force used in the apparatus of the invention and a fragmentary plane view of the sprue used in conjunction with the mold force.

The container 11 formed by the apparatus of the invention as shown in FIG. 1 includes a container top 12, a container bottom 13, and hinges 14. Each hinge 14 is composed of a male hinge member 15 and a female hinge member 16 as shown in FIGS. 2 and 3. The male hinge member 15 projects from the container top 12 and the female hinge member 16 projects from the container bottom 13. The female hinge member 16 has an eye 17 extending therethrough and the male hinge member 15 has a pintle 18 projecting perpendicularly from the body of the male hinge member 15. The outer diameter of the pintle 18 is smaller than the inner diameter of the eye 17 in female hinge member 16 and projects therethrough, leaving a clearance between pintle 18 and the inner surface of eye 17. The container can be secured in a closed position by means of projections shown in FIG. 1 which come over and lock with respect to one another upon closing the container.

When the thermoplastic container 11 leaves mold 20, the male hinge member 15 and its pintle 18 are molded in such a way that the pintle 18 projects through eye 17 in a female hinge member 16. At the same time the container top 12 and bottom 13 leave the mold 20 (FIG. 5) with their respective male hinge members 15 and female hinge members 16 operatively engaged, thereby forming hinges 14.

Mold 20 (FIG. 5) for forming container 11 has a mold force 21 (FIG. 4) and cavity block 22 (FIG. 6). The cavity block 22 is fastened to a mold mounting plate 23 by fastening means 24. The cavity block 22 has a cavity 25 for forming the container top and a cavity 26 for forming the container bottom. In addition the cavity block 22 also has cavities or recesses 27 for forming the male hinge members. Cavities 27 which are located between container top forming cavity 25 and container bottom forming cavity 26 open into the container top forming cavity 25. Also located in the cavity block 22 are cavities 28 for forming the female hinge members. Cavities 28 which are located adjacent to the male hinge member forming cavities 27 open into the container bottom forming cavity 26.

The cavity block 22 has on its periphery a runner 29 which connects to a sprue 30 (FIG. 5), outlet 31 and cavity gates 32. The cavity gates 32 are located in the cavity block 22 adjacent to the depressions 33 which form locking projections 19. The depressions individually communicate with the container top forming cavity 25 and container bottom forming cavity 26, respectively.

Pin or pintle 18 of male hinge member 15 and eye 17 of female hinge member are formed by means of retractable hollow cores or core pins 34 which are reciprocated in a plane extending through the split line of the mold 20. Each of the core pins includes a body portion 35 and a hollow head portion 36 disposed at one end of the body portion. As shown in FIG. 8, body portion 35 is cylindrical in form and of a diameter somewhat less than that of the female hinge member forming cavity 28. Head portion 36 is also cylindrical in form and of an outside diameter less than the outside diameter of the female hinge member cavity 28.

The cavity block 22 has outer core pin seats 37 for receiving each of the core pins 34. The outer core pin seats 37 are each perpendicular to the female hinge member forming cavities 28 and in connection therewith. Inner core pin seats 38 which are disposed between the female hinge member forming cavities 28 and the male hinge member forming cavities 27 are centered about the same axis as the outer core pin seats 37.

When the core pins are assembled with the mold 20, body portion 35 has a sliding fit with seat 37 and the corresponding portion of the mold force. Similarly head portion 36 has a sliding fit with seat 38 and its corresponding portion. As shown in FIG. 8, core pin 34 is in its advanced or inserted position where the hollow portion of head portion 36 connects with the exterior of cavity 27, thereby integrally forming an overall cavity or recess for molding male hinge member 15 and its pintle 18. In the same inserted position, the outside diameter of head portion 36 by extending through female hinge member 16 transforms female hinge member cavity 28 into an annular region or cavity. In this way it can be seen that the radial wall thickness of head portion 36 determines the radial clearance between pintle 18 and the eye 17 of female hinge member 16.

The cavity block 22 has core pin slide seats 39 located adjacent the outer core pin seats 37. The seats are disposed along the same axis as the core pin slide seats 39. At the rear of the core pin slide seats 39 are downwardly projecting keys 40. The keys 40 have beveled edges 41 which face toward the outer core pin seats 37. Relative movement of keys 40 with respect to core pins 34 causes the core pins to advance and retreat.

Located at the corners of the mold mounting plate 22 are guide pins 42 for insuring the correct register of the two halves of the mold when closed. Cooling channels 43 pass through the cavity block 21.

The mold force 21 is attached to a force retainer plate 44 by attaching means 45. The mold force 21 has force plugs 46 which partially project into the container top forming cavity 25 and container bottom forming cavity 26 when the mold force 21 and cavity block 23 are mated as shown in FIG. 5. The mold force 21 has the following elements which are mirror images of corresponding elements found in the cavity block 22; male hinge member forming cavities 27, female hinge members forming cavities 28, outer core pin seats 37, inner core pin seats 38, and a runner 29. The mirror image elements of the mold force 21 communicate with corresponding elements in the cavity blocks 22 when the mold 20 is closed (FIG. 5 and FIG. 9).

The mold force 21 has slide seats 47 which are disposed in a facing relationship with the slide seats 39 in the cavity block 22 but are wider, the additional space being occupied by slide guides 48. Slides 49 are movable mounted in the mold force slide seats 47 and are loaded in the retracted position (FIG. 7) by springs 50. The slides 49 have beveled heels 51 which are adapted to be engaged by the beveled edges 41 of keys 40 when mold force 21 and cavity block 22 are brought together to form mold 20. Mounted on the slide faces 52 are core pins 34 which are inserted into the mold 20 as cavity block 22 and mold force 21 are brought together, insertion being produced by the engagement of beveled heel of slides 49. Guide pins 42 and guide pin slots 53 insure proper register of mold force 21 and cavity block 22.

OPERATION

In operation, the cavity block 22 and mold force 21 are attached to a mold mounting plate 23 and a force retainer plate 44, respectively, in such a manner that the cavity block 22 overlies the mold force 21, the force plugs 46 being positioned beneath the container top forming cavity 27 and the container bottom forming cavity 28.

The guide pins 42 and guide pin seats 53 insure the maintenance of this relationship when the cavity block 22 and mold force 21 are brought into register.

When cavity block 22 and mold force 21 are brought into register, the female hinge member forming cavities 28 in both cavity block 22 and mold force 21 will open into each other and communicate with the container bottom forming cavity 26; similarly the male hinge member forming cavities 27 in both cavity block 22 and mold force 21 will open into each other end communicate with the container top forming cavity 25. Simultaneously the bevel edged keys 40 engage the core pin slides 49 along their beveled heels 51, thereby forcing the slides 49 to move in the slide seats 39 until the core pins 34 are in the fully inserted position, with the hollow head portions 36 of the core pins 34 passing through the female hinge member forming cavities 28. In this way the annular cavity needed to form eye 17 in the female hinge member is created. In the fully inserted position the hollow head portion of the core pins 34 open into the male hinge member forming cavities 27 thus providing a place for the material to flow which forms pintle 18.

Once the core pins 34 are in the inserted position, thermoplastic material is introduced into sprue 30 and passes down to the sprue outlet 31 and into the runners 29. The plastic material under pressure passes down the runners 29 and flows through the gates 32 into catch closing forming depressions 33, the container top forming cavity 25 and the container bottom forming cavity 26.

When the container top forming cavity 25 and the container bottom forming cavity 26 have been filled, the fluid pressure in mold 20 forces the plastic material into the male and female hinge forming cavities 27, 28.

The plastic material flows into the female hinge member forming cavities 28 and around the core pin hollow head portion 36. The plastic material fills the male hinge member forming cavities 27 and also fills the hollow head portion of the core pin 36, the core pin head being hollow to a point past the female hinge member forming cavities 28. The plastic material inside the female hinge member forming cavities 23 is kept from flowing into contact with the male hinge member forming cavities 27 via the inner core pin seats 38 due to the sliding fit present when the core pins 34 are in the core pin seats 38. The plastic in the core pin hollow head portion 36, however, passes from the male hinge member forming cavities 27 through the female hinge member forming cavities 23 but is isolated therefrom by the walls of core pin hollow head portions 36. Once the thermoplastic material has been allowed to set by the cooling action of water passing through the cooling channels 43, the mold 20 is separated. As the keys of the cavity block raise, the spring loading of the core pin slides 49 move in their seats 39 to the extracted position. Upon disengagement of the core pins 34, the pintle 18 protrudes through eye 17 of female hinge member 16. The hinged plastic container 11 with its hinges in the mated position is then blown free by compressed air flowing through a knockout bore.

In a variation of the disclosure set forth above, by using a cavity block 22 as shown in FIG. 11 having two independent sprues 30 and runner systems 29, each connected to a different one of two portions of the cavity block 22, it is possible to mold the container top and bottom portions of different materials and also possible to mold them in different colors. In the case of a plastic bottle having a cap or cover hinge thereon, the container portion can be molded from clear non-resilient plastic and the cap portion can be simultaneously molded from a colored resilient plastic.

Although various versions and embodiments of the invention have been shown and described herein, it is understood that certain changes within the scope of the appended claim may be made by those skilled in the art without departing from the scope and the spirit of this invention.

I claim:
1. A die for molding an article having two members articulated to one another by at least one hinge, the hinge having two parts each connected to a different one of the members, one part of the hinge having one support extending from one member and having a stud projecting therefrom, the other part of the hinge having another support extending from the other member and having an opening therein through which the stud extends, said die being adapted to mold the member with each part of the hinge integral therewith and with the stud engaged in the opening, said die comprising a body portion having means for molding each of the members adjacent to one another and having cavities in communication with said molding means for forming the supports of the hinge, each of said cavities being positioned adjacent one another in a facing relationship in correspondence to the positioning of the parts of the hinge when the stud is operatively engaged in the opening, and a core member mounted for movement along an axis extending through one of said cavities for forming the opening in the other support of the other part of the hinge and extending adjacent the other of said cavities for forming the one support of the one part of the hinge, said core member having an opening extending inwardly from one end thereof in a direction parallel to the axis of movement of said core member, and means for moving said core member between an advanced position in which said core member extends through said one of said cavities to adjacent said other core member is removed from adjacent said other cavity and from said one cavity, said opening in said core member in the advance position thereof being adapted to form the stud projecting from the one support of the one part of the hinge.

References Cited
UNITED STATES PATENTS 2,687,157  8/1954  Cowan.
2,778,533  1/1957  Savary.
2,875,472  3/1959  Marcus. _____ 249—68
3,013,308  12/1961  Armour.

J. HOWARD FLINT, JR., Primary Examiner

U.S. Cl. X.R.

16—128; 18—2, 5, 30, 42; 264—238

PO-1050
(5/69)

UNITED STATES PATENT OFFICE
CERTIFICATE OF CORRECTION

Patent No. 3,456,913    Dated July 22, 1969

Inventor(s) Michael Lutz

It is certified that error appears in the above-identified patent and that said Letters Patent are hereby corrected as shown below:

Column 6, claim 1, line 49 - after "other" and before "core" insert the following:

-- of said cavities and a retracted position in which said --

SIGNED AND SEALED

NOV 25 1969

(SEAL)
Attest:

Edward M. Fletcher, Jr.
Attesting Officer

WILLIAM E. SCHUYLER, JR.
Commissioner of Patents